(12) United States Patent
Henderson (10) Patent No.: US 7,909,340 B2
(45) Date of Patent: Mar. 22, 2011

(54) VEHICLE WITH IMPROVED INTEGRATED STEERING AND SUSPENSION SYSTEM

(76) Inventor: Laddie Gene Henderson, Pacific City, OR (US)

( * ) Notice: Subject to any disclaimer, the term of this patent is extended or adjusted under 35 U.S.C. 154(b) by 1 day.

(21) Appl. No.: 12/576,192

(22) Filed: Oct. 8, 2009

(65) Prior Publication Data

US 2010/0194068 A1 Aug. 5, 2010

Related U.S. Application Data

(63) Continuation-in-part of application No. 12/322,533, filed on Feb. 3, 2009, now Pat. No. 7,708,291.

(51) Int. Cl.
B60G 21/04 (2006.01)
B62D 9/04 (2006.01)
(52) U.S. Cl. ............. 280/124.103; 280/62; 280/771; 280/778; 280/87.1
(58) Field of Classification Search .......... 280/124.103, 280/771, 778, 62, 87.1
See application file for complete search history.

(56) References Cited

U.S. PATENT DOCUMENTS

| | | | | |
|---|---|---|---|---|
| 3,746,118 A * | 7/1973 | Altorfer | ............ | 180/210 |
| 4,088,199 A * | 5/1978 | Trautwein | ............ | 180/209 |
| 4,740,004 A * | 4/1988 | McMullen | ............ | 280/269 |
| 5,501,478 A * | 3/1996 | Doan | ............ | 280/282 |
| 6,817,617 B2 * | 11/2004 | Hayashi | ............ | 280/5.509 |
| 6,953,203 B2 * | 10/2005 | Wilcox et al. | ............ | 280/282 |
| 7,097,187 B2 * | 8/2006 | Walters et al. | ............ | 280/124.128 |
| 7,487,985 B1 * | 2/2009 | Mighell | ............ | 280/124.103 |
| 7,568,541 B2 * | 8/2009 | Pfeil et al. | ............ | 180/210 |
| 7,708,291 B1 * | 5/2010 | Henderson | ............ | 280/124.103 |
| 7,722,063 B2 * | 5/2010 | Dieziger | ............ | 280/124.103 |
| 2003/0102176 A1 * | 6/2003 | Bautista | ............ | 180/210 |
| 2004/0051269 A1 * | 3/2004 | Bouton | ............ | 280/124.103 |
| 2005/0012291 A1 * | 1/2005 | Bagnoli | ............ | 280/124.103 |
| 2005/0206101 A1 * | 9/2005 | Bouton | ............ | 280/6.154 |
| 2007/0075517 A1 * | 4/2007 | Suhre et al. | ............ | 280/124.134 |
| 2007/0246903 A1 * | 10/2007 | Melcher | ............ | 280/124.103 |
| 2007/0262548 A1 * | 11/2007 | Rawlinson | ............ | 280/124.103 |
| 2007/0262549 A1 * | 11/2007 | Haerr et al. | ............ | 280/124.103 |
| 2008/0115994 A1 * | 5/2008 | Martini et al. | ............ | 180/210 |
| 2008/0197597 A1 * | 8/2008 | Moulene et al. | ............ | 280/124.103 |
| 2008/0209880 A1 * | 9/2008 | Derby et al. | ............ | 56/10.8 |
| 2008/0258415 A1 * | 10/2008 | Melcher | ............ | 280/124.103 |
| 2008/0258416 A1 * | 10/2008 | Wilcox | ............ | 280/124.103 |
| 2009/0194961 A1 * | 8/2009 | Dieziger | ............ | 280/124.103 |

* cited by examiner

*Primary Examiner* — Toan C To
*Assistant Examiner* — Barry Gooden, Jr.
(74) *Attorney, Agent, or Firm* — Mark S. Hubert (57) ABSTRACT

A three wheeled vehicle that has an improved dual front wheel integrated steering and suspension system that allows the vehicle to be maneuvered by a combination of arm and leg steering movements coupled with front end leaning that shifts the center of mass of the vehicle down and toward the inside wheel. This transfer of mass counteracts a conventional cornering vehicle's tendency to fling its mass to the outside wheel and lift the inner wheel off the ground as well as changing the angle of the line of force exerted through the tires, and enhancing the vehicles's grip on the ground. The vehicle has a reduced amount of sliding and potential of flipping when turning sharply. The steering system is compatible with traditional ACKERMAN steering geometry wherein the inner wheel turns in a smaller diameter circle than the outer wheel.

12 Claims, 10 Drawing Sheets

VEHICLE WITH IMPROVED INTEGRATED STEERING AND SUSPENSION SYSTEM

This is a continuation-in-part of non-provisional utility patent application Ser. No. 12/322,533 filed Feb. 3, 2009 and entitled "Vehicle with Improved Steering." This application repeats a substantial portion of the prior application, and adds and claims additional disclosure not presented in the prior application. Since this application names the inventor named in the prior application, it is filed under 35 USC 153(b) and claims priority thereto under 35 USC 120. This application incorporates by reference all elements thereof non-provisional utility patent application Ser. No. 12/322,533.

BACKGROUND OF THE INVENTION

The present invention relates to a vehicle with two front wheels that have an improved integrated steering and suspension system.

Prior art three wheeled vehicles exist with ACKERMAN steering geometry, but none that utilize matched upper and lower A frame arms, configured so as to have neutral steering and to shift the vehicle's mass lower and toward the inner turning wheel when cornering.

The three wheeled vehicle's unified steering and suspension system fulfills a long felt need in the field of dual front wheel steering systems on three and four wheeled vehicles, powered or otherwise. This new invention utilizes and combines known and new technologies in a unique and novel configuration to overcome the prior art problems of vehicle rollover or skidding when making sharp or high speed turns.

SUMMARY OF THE INVENTION

The general purpose of the present invention, which will be described subsequently in greater detail, is to provide a method of two wheel front steering for three and four wheeled vehicles that is able to shift the mass of a turning vehicle lower (down) and closer to the inside turning wheel while still utilizing known steering technology that allows the inner wheel to turn sharper than the outer wheel to allow the inner wheel to travel in a smaller diameter circle than the outer wheel. This is a drastic departure from conventional steering geometry and has several advantages that are accented at higher speeds and as such is well suited for racing vehicles. Notably, when a racing vehicle goes into a corner the vehicle's mass is shifted to the outside wheel and the lightened inner wheel attempts to lift off of the ground. To compensate for this the race tracks are banked in the corners such that the outer wheel is at a higher elevation relative to the inner wheel.

With the present invention turning is much safer and can be accomplished at higher speeds. When the vehicle's mass is transferred down and inward upon cornering there are three main advantages. First, the inner wheel is less likely to lift off the ground and the vehicle is less likely to roll over away from the corner. Second, when in extremely sharp corners this shift of mass down and inward allows the line of force on the vehicle tires to be at a less acute angle with respect to the ground. This is especially attractive to vehicles such as motorbikes with thin wheels. When thin wheels corner their lean causes more of the tire sidewall to contacts the ground. Since the sidewall is not as good at holding the ground as the tread, scrubbing (sideways slipping or sliding) can occur in the corner. With the line of force less acute, more mass is placed on the treaded part of the wheel and the wheels "grip" is enhanced. This keeps the tire temperatures and the sidewall stresses lower. Third, the vehicle responds with a neutral handling condition in which during cornering the circular path of the vehicle's motion is of the same radius of the circle indicated by the direction its wheels are pointed (since there is no scrubbing).

It has many of the advantages mentioned heretofore and many novel features that result in a new invention which is not anticipated, rendered obvious, suggested, or even implied by any of the prior art, either alone or in any combination thereof.

In accordance with the invention, an object of the present invention is to provide an improved dual front wheel integrated steering and suspension system that shifts the vehicle's mass inward and downward when cornering.

It is another object of this invention to provide an improved dual front wheel steering and suspension system capable of integration with existing steering systems having ACKERMAN steering geometry.

It is a further object of this invention to provide an improved three wheel vehicle that can be steered and leaned through a combination of shifting the driver's body position in relation to the vehicle through the exertion of force on the vehicle's handlebars and foot pegs.

It is still a further object of this invention to provide for an improved dual front wheel steering and suspension system that incorporates a matched set of upper and lower A arms, does not use a toe angle, utilizes ACKERMAN steering geometry, and has a positive castor angle.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The steering system described herein is just as applicable for use on a four wheeled vehicle as on the three wheeled vehicle described herein. The three wheeled embodiment was chosen for purposes of clarity in the illustrations. The invention is capable of other embodiments and of being practiced and carried out in various ways. Also, it is to be understood that the phraseology and terminology employed herein are for the purpose of descriptions and should not be regarded as limiting.

This invention allows the center of gravity of a cornering vehicle to be transferred down (lower than in the straight ahead position) and toward the inside wheel, which is the opposite effect a conventional vehicle encounters when cornering. This prevents the inside wheel from lifting off the ground in extreme vehicular turning maneuvers, prevents wheel scrubbing, minimizes tire sidewall stress and heat buildup, and allows a neutral vehicle handling condition. All these attributes are extremely attractive features when racing.

The vehicle has steering, leaning and suspension functions that will be discussed separately. These functions can be operated independently (I.E. one can lean the front wheels but not turn, turn but not lean the front wheels and turn and lean the front wheels simultaneously as well as activate the suspension system when turning, navigating straight or when stationary.) Operation in unison results in moving the vehicle's mass downward and inward towards the inside wheel when cornering, while allowing the front wheel suspension system to function independently. This accomplishes the three effects discussed above while still permitting a smoothened ride.

Figure 3:
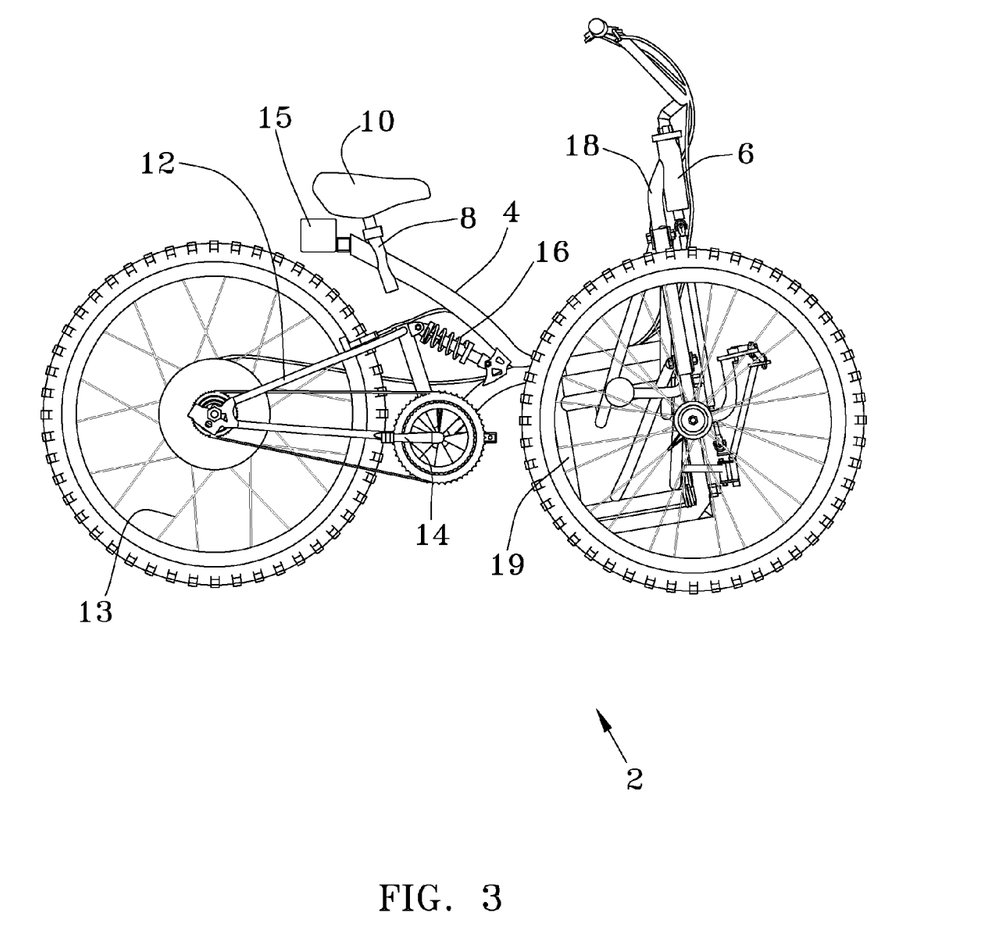
FIG. 3 is a side view of the vehicle with improved integrated steering and suspension system.

Looking at FIG. 3 it can be seen that the trike 2 has a main frame 4 that conventionally supports a steering post 6, a seat post 8 and seat assembly 10, a pivotally connected rear fork set (or swing arm) 12 and rear drive wheel and axle assembly 13, an optional crank arm set 14, a battery 15. A pivot plate 17 is rigidly affixed to the frame 4 adjacent the crank arm set 14 and is pivotally connected to the swing arm 12 to accommodate the swing arm 12 displacement as it traverses uneven terrains. (See FIG. 9) There is unitary shock absorber means 16 connected between the swingarm 12 and the frame 2 that smooths out the ride by dampening any differences in the relative positions or included angle between the swingarm 12 and the frame 4. A front vertical stanchion 18 rigidly extends from the main frame 4 and is held in a parallel configuration with a rear vertical stanchion 19 by upper spacer 21 and lower spacer 22. (See FIG. 10) Lower A frame arm 58 and the upper A frame arm 60 are held in a parallel configuration. Upper spacer 21 is rigidly connected to the midpoint of the two tubes forming upper A frame arm. Lower spacer 22 is rigidly connected to the midpoint of the two tubes forming lower A frame arm. These spacers 21 and 22 each enable pivotal movement of the A frame arms on a pivot connector 25. The pivot connector 25 is inserted through orifices formed through the front vertical stanchion 18 and into the rear vertical stanchion 19 into an internal bushing fitted into each of the spacer's two ends so that the A frame can rotate about pivot connectors 25 inserted into the bushing as is well known in the art and not illustrated in detail herein. (See FIG. 9)

The outboard ends of the A frame arms are pivotally connected to the upper and lower ends of the right A frame arm spacer 32 and to the upper and lower ends of a substantially similar left A frame arm spacer 28. This pivotal connection is accomplished by the insertion of flange bearings into bushings inserted into the upper and lower ends of each A frame arm spacer that contact the inside surface of the U brackets 27 that are mechanically affixed to the outboard ends of each A frame arm. (See FIGS. 9 and 10) A retaining bolt 29 connects this pivotable assembly which is not shown in detail as such a pivotable assembly is well known in the industry.

The right A frame arm spacer 32 and left A frame arm spacer 28 are each mechanically connected to their associated right suspension tube 31 and left suspension tube 33. The suspension tubes may be conventional shock absorbers that utilize a piston, a pressurized gas or fluid, or may be simple compression springs trapped between sets of concentric tubes, as is well known in the art. Regardless of the style, the right suspension tube 31 has a right inner shock arm 35 and the left suspension tube 33 has a left inner shock arm 37 that each have a lower J configuration adapted to house and support the inboard end of the wheel axles 39. (See FIGS. 5 and 1) The suspension means, whatever it's design, is constrained between the shock arm and the suspension tube. The inner shock arms are able to rotate within the suspension tubes as well as travel vertically so as to accommodated turning of the wheels and dampened vertical motion of the wheels independently.

The J configuration of the inner shock arms also each have a secondary steering arm extending there from that pivotally connect to one end of the steering tierod 36. This functions to turn the two front wheels simultaneously. The right secondary steering arm 26 and left secondary steering arm 24 can be seen in FIG. 4.

Figure 8:
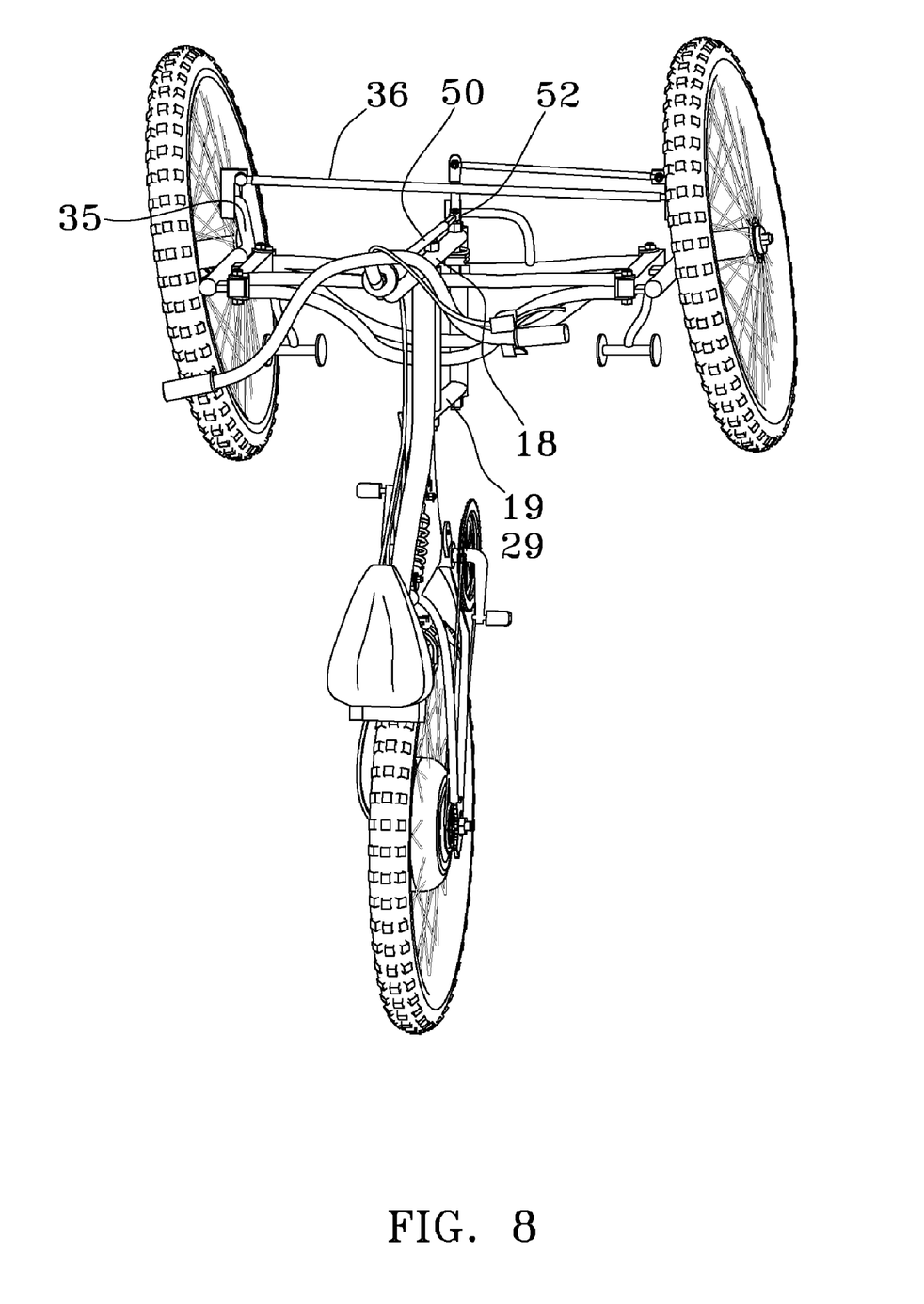
FIG. 8 is top view of the vehicle with improved integrated steering and suspension system turning to the left.

Handlebar 48 is rotationally mounted in the steering post 6. An upper universal joint 56 affixed to the section of handlebar extending below the post 6 connects to the top of a steering shaft. The upper yoke of the universal joint is affixed to the handlebar and the lower yoke is affixed to the steering shaft. The steering shaft is a two part assembly of an upper internally splined steering shaft 50 and an extendable externally splined (matingly conformed) lower steering shaft 52 that has the upper yoke of lower universal joint 57 affixed to its bottom end. (See FIGS. 5, 8 and 10) The lower yoke of the lower universal joint is affixed to the primary steering arm 59 which is pivotally connected to steering support 61. Steering support 61 is rigidly connected to the frame 6 by arm 63. (See FIG. 1) Primary steering arm 59 is connected to the left secondary steering arm 24 by linkage arm 44. (Although it may alternatively connected to the right secondary steering arm 26.

A motorized rear drive hub 80 resides in the rear wheel assembly 82 and its speed is controlled by actuator 84 mounted on handlebar 48 as is well known in the industry.

The Steering Function

Figure 1:
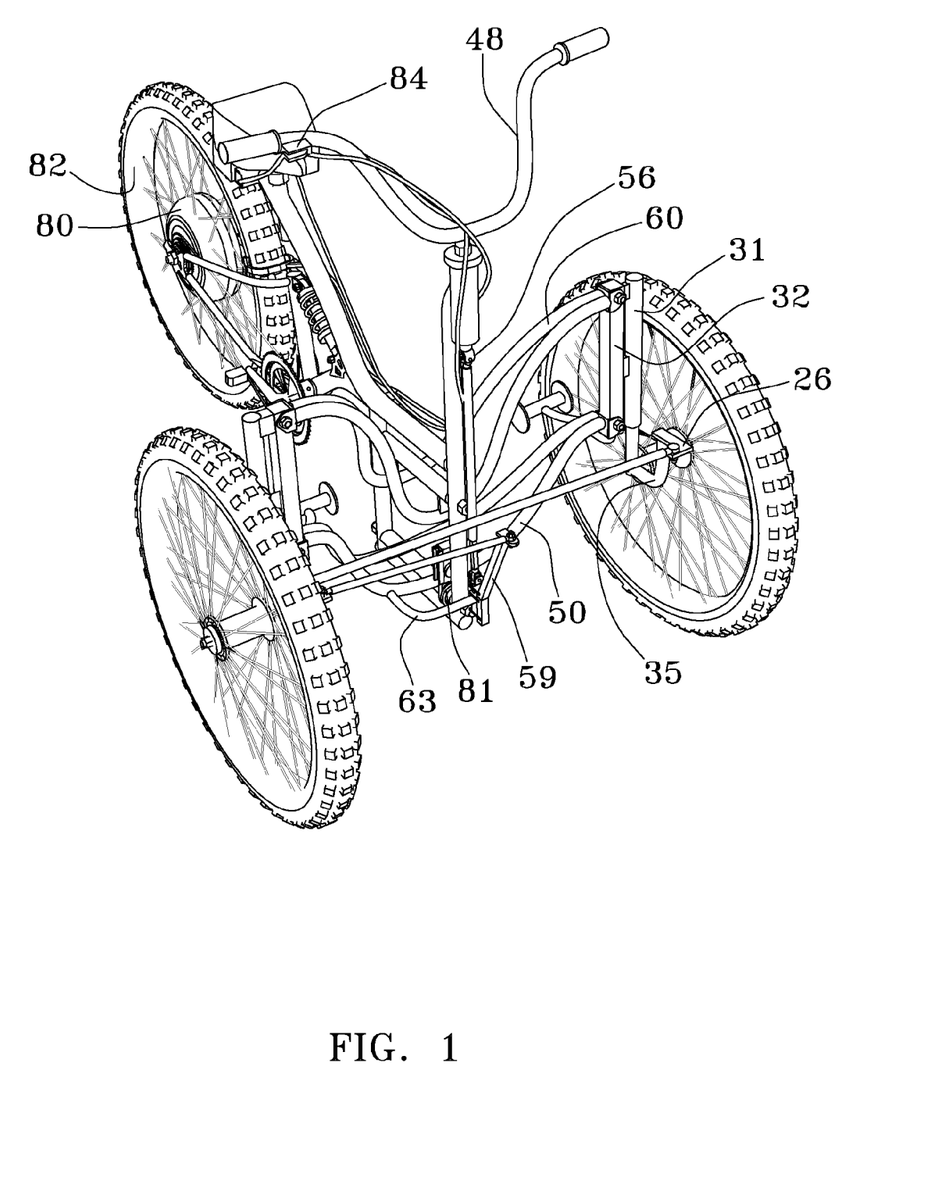
FIG. 1 is a perspective view of the vehicle with improved integrated steering and suspension system.
Figure 2:
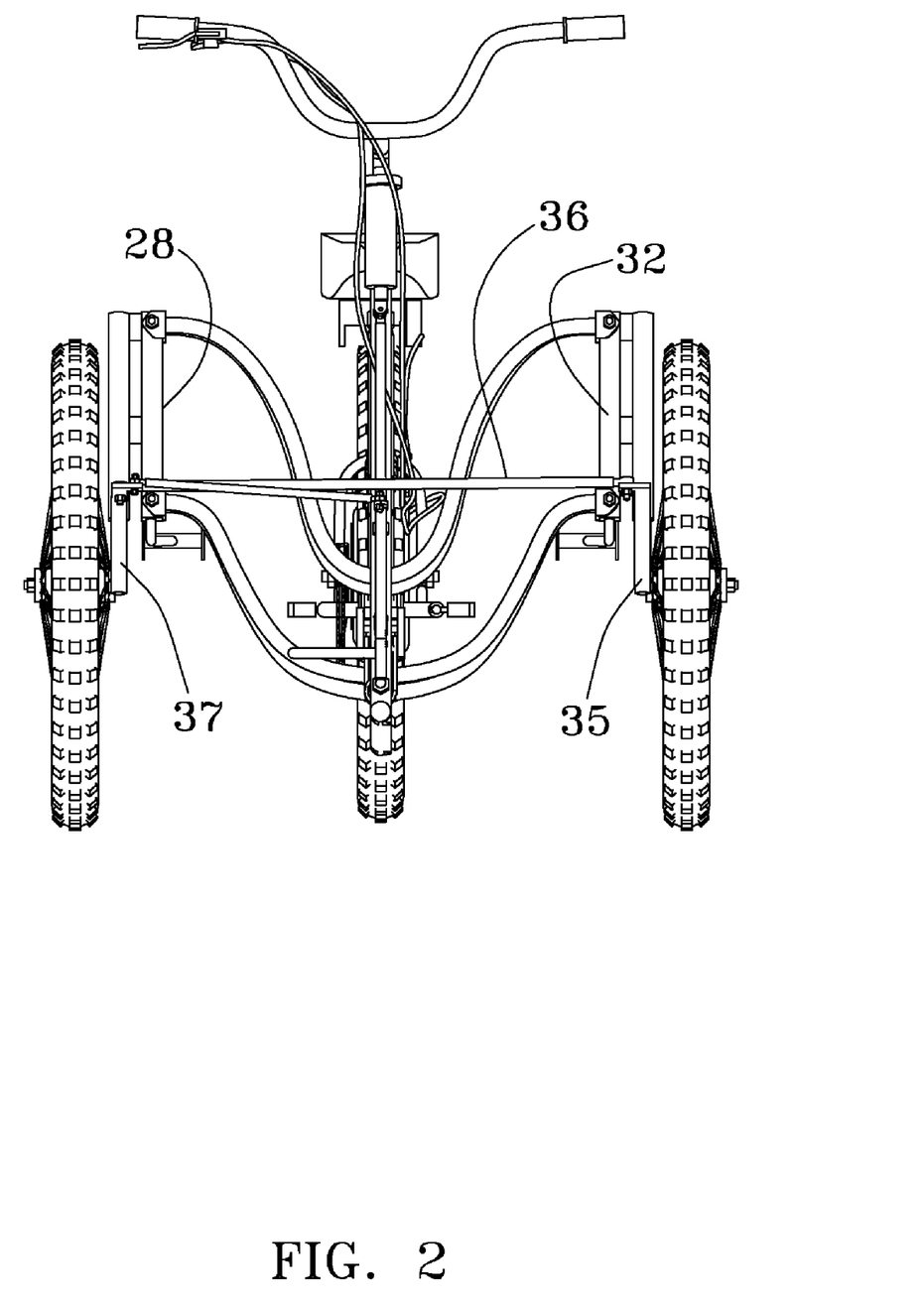
FIG. 2 is a front view of the vehicle with improved integrated steering and suspension system.
Figure 4:
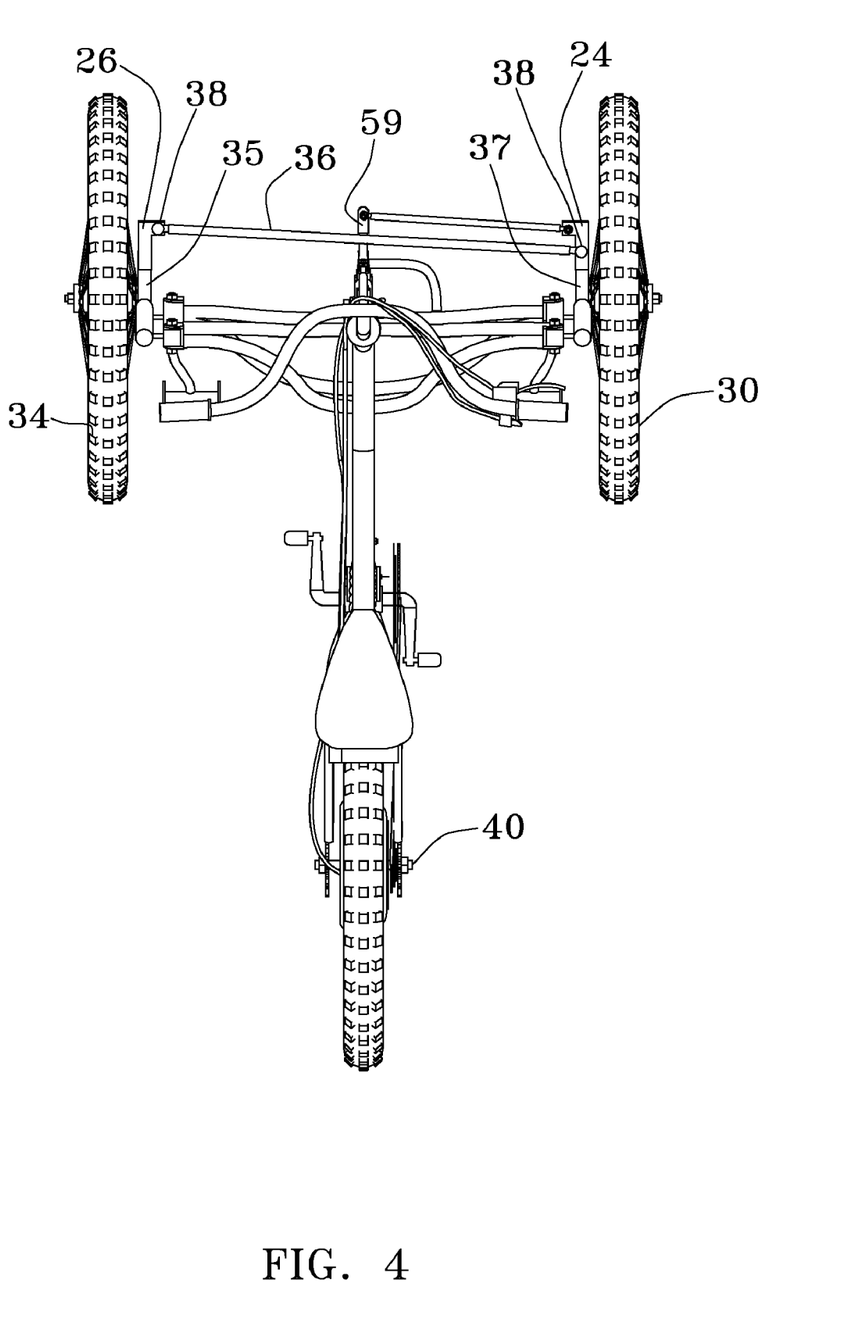
FIG. 4 is a top view of the vehicle with improved integrated steering and suspension system.
Figure 9:
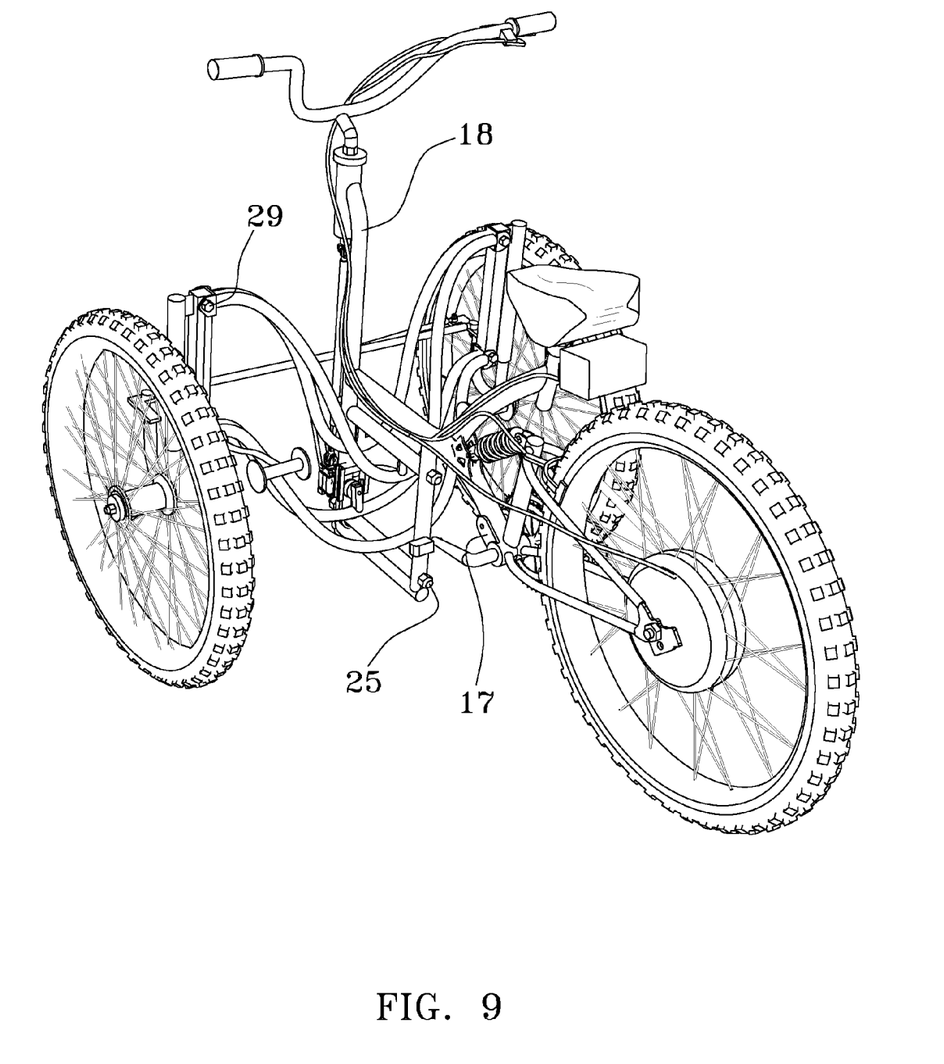
FIG. 9 is rear perspective view of the vehicle with improved integrated steering and suspension system.
Figure 10:
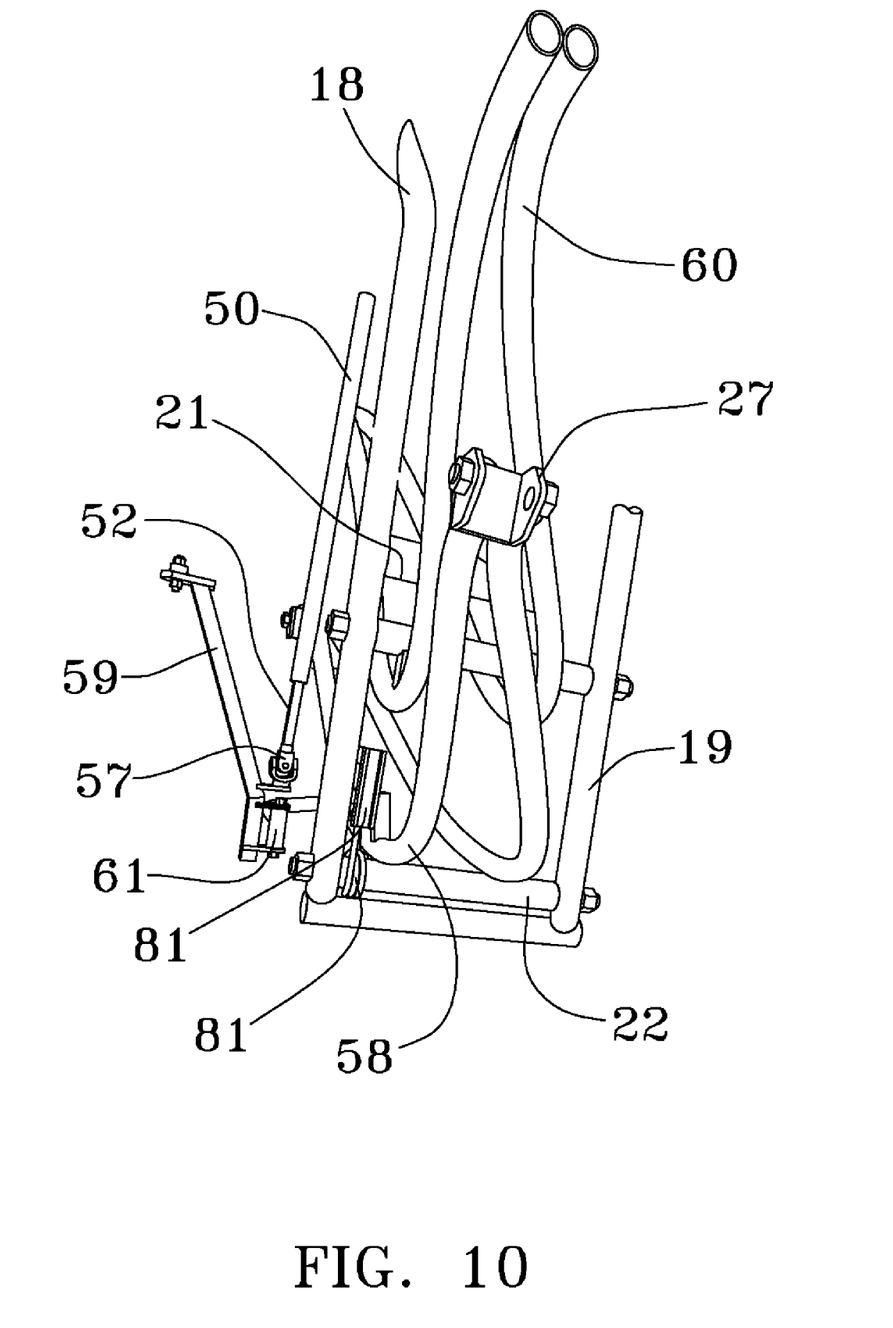
FIG. 10 is sectional view of the steering components in relation to the twin A frames.

The steering components and their configuration on the present invention can best be seen looking at FIG. 1 (perspective view), FIG. 2 (front view), FIG. 4 (top view), and FIG. 9 (rear perspective view) together. There are a pair of mirror image secondary steering arms, one left secondary steering arm 24 and one right secondary steering arm 26. The inboard end of the left secondary steering arm 24 is rigidly connected to the lower J configuration of the left inner shock arm 37 which is extendably housed in the left suspension tube 33. The left inner shock arm 37 also rotationally houses the axle for the left front wheel 30. Similarly, the inboard end of the right secondary steering arm 26 is rigidly connected to the lower J configuration of the right inner shock arm 35 which is extendably housed in the right suspension tube 31. The right inner shock arm 35 rotationally houses the axle for the right front wheel 34. The outboard ends of the two secondary steering arms are pivotally connected to each other by a rigid tierod 36 coupled at each of its ends to the secondary steering arms by pivotal connectors such as kingpins 38 which are well known in the industry. These form the pivot points for the steering of the two front wheels. It is to be noted that the kingpins 38 allow biaxial pivoting to accommodate the turning and leaning of the steering system. There is a plethora of mechanical connectors known in the art that allow biaxial pivoting and which could be substituted for the kingpins 38, such as ball joints wherein a ball stud is partially housed by a connectable body with a matingly conformed spherical inner surface. Other embodiments utilize a form of ball joint wherein a planar member having a concave aperture formed therein is matingly engaged around an external planar section of a spherical post.

The secondary steering arms are not parallel to each other. The inboard ends of the secondary steering arms (where they connect to the lower J configuration of the inner shock arms) are closer together than the outboard ends (where they connect to the steering tierod 36). The geometry is such that two straight lines may be drawn from the two kingpins 38, through the linear axis of the secondary steering arms and to the center of the rear axle 40. With this arrangement, at any angle of steering, the center point of all of the circles traced by all wheels will lie at a common point. Thus when turning, the inside wheel turns sharper than the outside wheel. This solves the problem of wheels on the inside and outside of a turn tracing out circles of different radii. Since the steering arrangement is such that when turning, one kingpin 38 is under center and the other kingpin 38 is over center, the wheel on the side of the vehicle in the direction of the turn will turn sharper than the other wheel.

The primary steering arm 59 and the left secondary steering arm 24 are linked by pivotal connections at either end of linkage arm 44 as discussed above. Both these pivotal connections are of a configuration to allow biaxial pivoting to accommodate the turning and leaning of the steering system. The other end of the primary steering arm 59 is rigidly interconnected to the handlebars 48 as discussed above.

When the handlebars 48 are turned in a direction, the top end of the steering shaft rotates such that its bottom end moves in the direction of the handlebar and turns primary steering arm 59 so as to exert a steering force through the linkage arm 44 to the left secondary steering arm 24 which simultaneously turns the left wheel 30 and transmits the corresponding force to the right secondary steering arm 26 and the right front wheel 34 through tierod 3.

The upper steering shaft 50 is rotationally supported on a set of bearings that reside within the steering post 6. The upper steering shaft 50 and the lower steering shaft 52 form a extendable steering shaft that is able to lengthen and shorten to accommodate the leaning of the trike. Looking at FIG. 4 the 7 degree positive castor angle can be seen. That is to say that the angle of a line drawn through the longitudinal axis of either of the front forks would not extend through the point where the front wheel contacts the ground but rather would fall ahead of that. The angle that resides between this line and a vertical line would be approximately 7 degrees, which has experimentally been shown to give a good balance of self-centering for the steering. When the wheel trails behind the axis of steering the vehicle has better directional stability and a lessened tendency to wander, making the overall steering experience pleasant.

The Leaning Function

Looking collectively at FIGS. 1, 2, 5 and 6, the leaning function components can best be seen. A lower A frame arm 58 and identical, parallel upper A frame arm 60 are pivotally connected at their midpoints to the front vertical stanchion 18 and rear vertical stanchion 19. Each A frame arm has a front tube and a rear tube that merge together at outboard ends and increasingly diverge to a maximum distance by their midpoints where their spacer resides. The outboard ends of the A frame arms are pivotally connected to the upper and lower ends of the A frame arm spacers 32 and suspension tubes as detailed above and illustrated in FIGS. 9 and 10.

It is of utmost importance that the midpoint pivotal connection of the upper A frame arm 60 and the front vertical stanchion 18 lies along a horizontal line between the retaining bolts 29 of the U brackets 27 that are mechanically affixed to the outboard ends of lower A frame arm 58. Foot steering pegs 20 are affixed about their midpoints to the bottom of the A arm pivot spacer 32, although they may alternatively be placed on the lower A frame arm 58. In this location the pegs 20 will angle with any leaning of the wheels. Since the upper and lower A frame arms are identical and parallel, the distance between the outboard ends of the upper and lower A frame arms on their respective frame arm spacers and the distance between the midpoint pivotal connections of the upper and lower A frame arms is identical. In this manner the longitudinal axis of the frame arm spacers (and connected suspension tubes, inner shock arms and wheels) remain parallel at all times.

In operation, to lean the front wheels the rider shifts his weight to one side of the vehicle by leaning at the waist causing the top end of the frame 4 to move away from the vehicle's centerline and toward the direction the rider is leaning in, or alternatively, the rider pushes their legs against the foot steering pegs 20 forcing the bottom end of the frame 4 away from the centerline of the vehicle and away from the direction the rider wishes to lean the vehicle. In either of these maneuvers the lower A frame arm's midpoints and the upper A frame arm's midpoints (the locations on the A frame arms where the lower or upper spacers connect) remain the same distance apart, fixed on the front vertical stanchion 18 and rear vertical stanchion 19, although the stanchions now reside at an acute angle with respect to the vertical. It is important to note that the midpoint of the upper A frame arm remains in extremely close horizontal alignment with the lower A frame arm's outboard arms within the given range of lean for the steering system.

Figure 5:
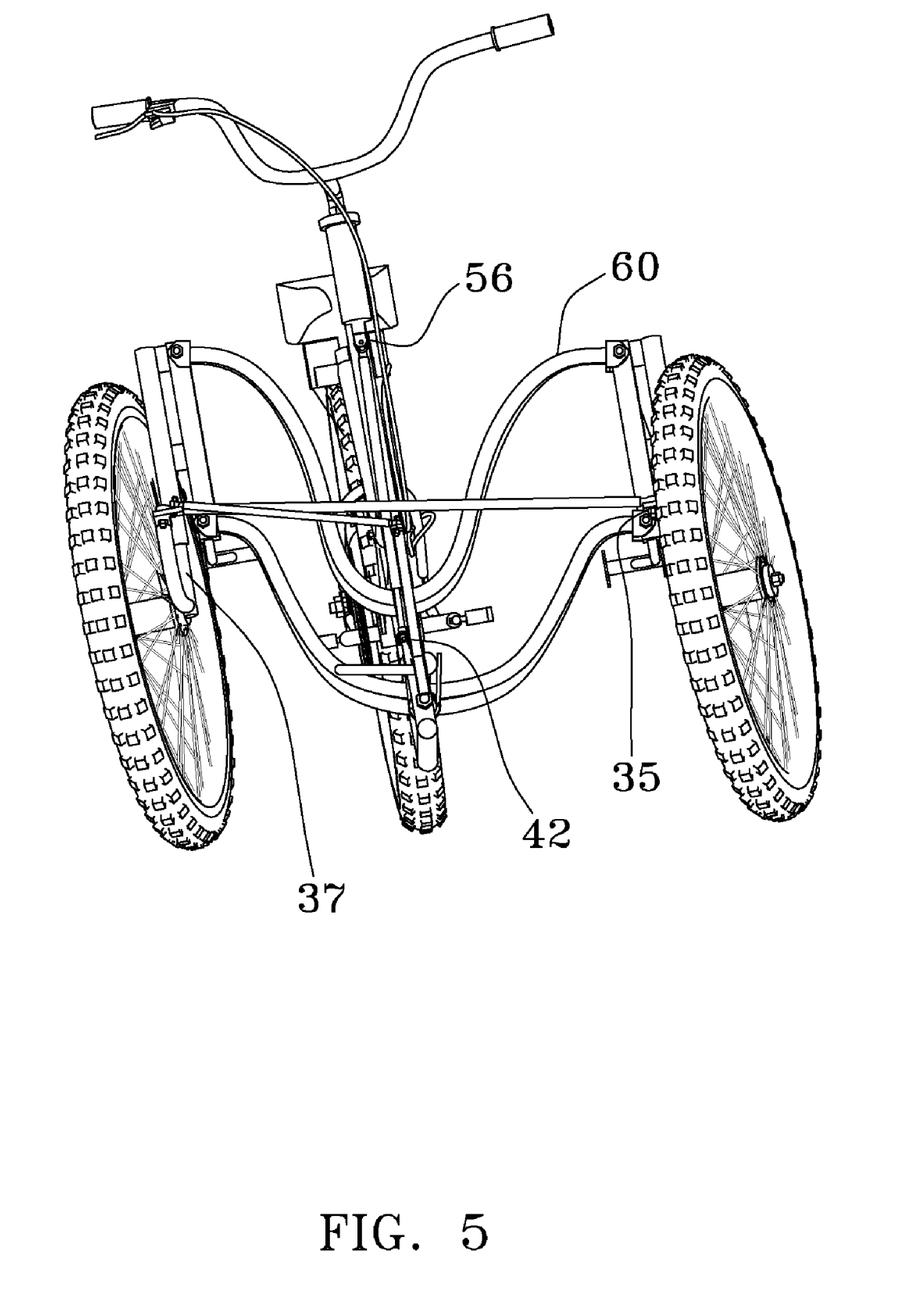
FIG. 5 is front view of the vehicle with improved integrated steering and suspension system turning to the right.

As the front vertical stanchion 18 moves to the right (rider's perspective) as depicted in FIG. 5 the upper A frame arm 60 pushes on the top end of the right frame arm spacer 33 and pulls on the top end of the left frame arm spacer 32 while the lower A frame arm 58 pushes on the bottom end of the left frame arm spacer 32 and pulls on the bottom end of the right frame arm spacer 33. This causes both the right and left frame arm spacers to pivot within the U brackets 27 and to lean at the same acute angle with respect to the vertical as the front vertical stanchion 18.

When the vehicle leans, the lower steering shaft 52 telescopically extends from the upper steering shaft 50 lengthening the assembly to compensate for the increase in distance between the steering post 6 and the primary steering arm 59. The use of lower universal joint 42 and upper universal joint 56 allow for the continued non binding rotation of the primary steering arm 59 by the handlebars 48. In this way the wheels ability to turn with the handlebars remains unaffected and independent of the leaning function.

When the vehicle leans, the tie rod 36 also tilts and would jam or deform at its outboard ends if kingpins 38 that did not allow pivotal motion in two axis were not used. The use of a biaxial rotational or pivot mechanism like the kingpins or a conventional ball joint allow the steering and leaning functions to function independently or simultaneously.

Figure 6:
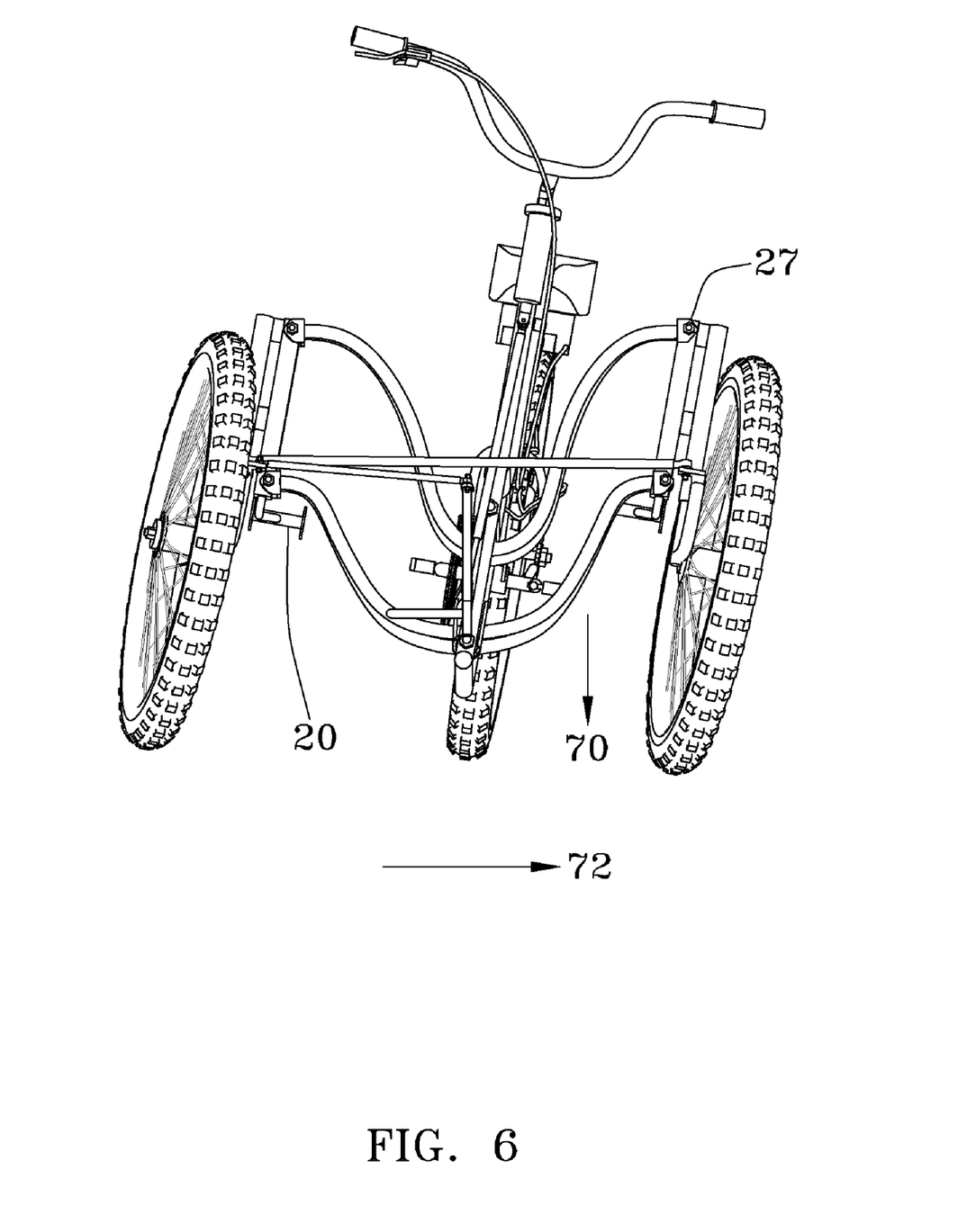
FIG. 6 is front view of the vehicle with improved integrated steering and suspension system turning to the left.

Looking at FIG. 6 the combined leaning and steering functions will best be appreciated. It can be seen that the vehicle's mass moves downward as indicated by directional arrow 70 and inward as indicated by directional arrow 72. This feature helps maintain neutral steering, avoids wheel scrubbing on sharp turns, reduces tire sidewall stress and heat buildup, and minimizes the possibility of the inner wheel lifting off of the ground when cornering hard or at high speeds.

With the enhanced neutral steering of this system the trike wheels can lean without the trike turning to either side and will not steer to either side when going over a bump. The steering and leaning of the vehicles steering system as explained earlier, function independently however when combined drastically enhance the stability of the vehicle in hard or fast cornering.

Figure 7:
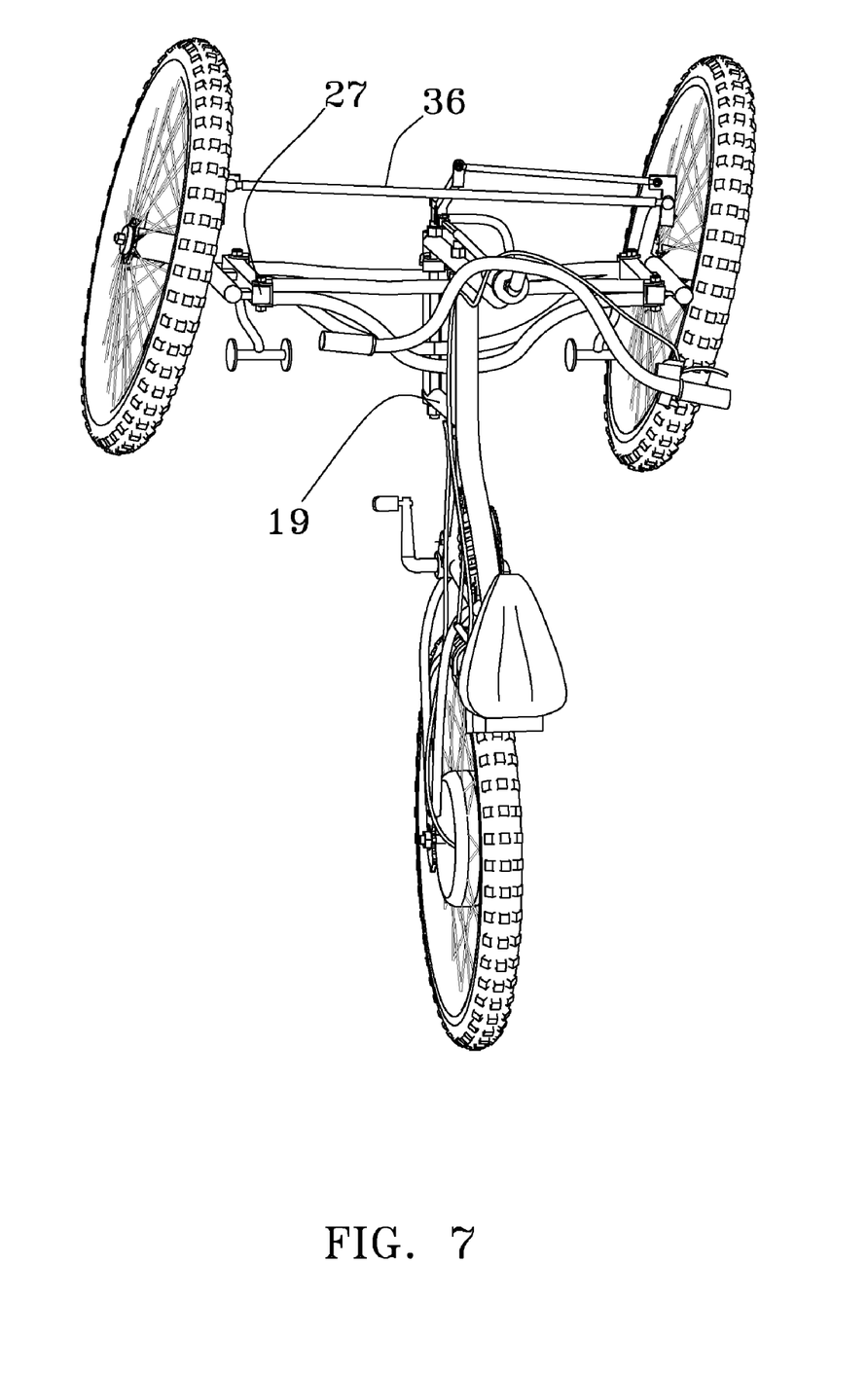
FIG. 7 is top view of the vehicle with improved integrated steering and suspension system turning to the right.

The trike 2 of the present invention utilizes a motorized drive hub 68 powered by a centrally mounted power supply 72 that controls the vehicle's speed through a control lever 70. (Ref FIG. 7) This type of drive configuration is well known in the field.

To help retain the vehicle in a vertical posture, a coil spring assembly 81 encircles the lower spacer 22 and has two spring arms extending outward that contact and exert outward pressure on two centering plates rigidly affixed to the front vertical stanchion 18. (See FIGS. 1 and 10)

Suspension System

The present design incorporates independent front wheel suspension accommodated by the independent vertical travel of the inner shock arms within the suspension tubes in response to the vertical position of either of the front wheels which are directly connected onto the lower J configuration of the inner shock arms. The rear wheel suspension utilizes a unitary shock absorber means 16 that smooths out the ride by dampening any differences in the relative positions of the swingarm 12 and the frame 4.

As discussed above when cornering, the vehicle's mass moves downward as indicated by directional arrow 70 and inward as indicated by directional arrow 72 in FIG. 6. Since the front wheels each have their own suspension system, the shift of mass when turning will place a greater load on the inner shock arm of the wheel in direction of the turn, which will cause the vehicle to move downward (drop lower) and further increase the stability of the vehicle when cornering. This is a dramatic enhancement over previous versions.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. An dual front wheel steering and suspension system adapted for operation with a three or four wheeled vehicle comprising:
   a vehicle frame;
   a front stanchion extending substantially vertically from said vehicle frame;
   a rear stanchion extending substantially vertically from said vehicle frame and residing parallel to said front stanchion;
   a manual steering member;
   a steering post extending from said front stanchion and rotationally supporting said manual steering member;
   a rotatable, telescopic steering column comprised of an upper steering column and an extendable lower steering column;
   a main steering arm;
   a first universal joint connecting said upper steering column to said manual steering member;
   a second universal joint connecting said extendable lower steering column to said main steering arm;
   a main steering arm support extending from a lower A frame arm and rotationally supporting said main steering arm;
   an upper A frame arm having two outboard ends each one pivotally connected to an upper end of a first or a second A frame arm outboard spacer member, and having a first midpoint spacer member pivotally connecting said upper A frame arm between said front and rear stanchions;
   said lower A frame arm having two outboard ends each one pivotally connected to a lower end of a said first or said second A frame arm outboard spacer member, and having a second midpoint spacer member pivotally connecting said lower A frame arm between said front and rear stanchions;
   two suspension members each rigidly connected to, and residing parallel to one of said A frame arm outboard spacer members;
   two wheel axles each connected to a different one of said suspension members;
   two front wheels each rotationally mounted on a different one of said axles;
   two secondary steering arms, each rigidly mounted onto one of said suspension members;
   a tierod having a first end and a second end each pivotally connected to one of said different secondary steering arms;
   a steering linkage rod having a first end pivotally connected to said main steering arm and a second end pivotally connected to one of said secondary steering arms; and
   two foot steering pegs wherein each one is rigidly mounted to one of said A frame outboard spacer members.

2. The improved dual front wheel vehicular steering and suspension system of claim 1 wherein said upper A frame arm and said lower A frame arm reside parallel to each other.

3. The improved dual front wheel vehicular steering and suspension system of claim 1 wherein said suspension members have an upper housing that partially constrains a suspension means and an extendable lower shock arm having a J shaped extension formed on a lower end thereof said shock arm to which said secondary steering arms are affixed.

4. The improved dual front wheel vehicular steering and suspension system of claim 1 wherein said lower and upper A frame arm's outboard ends each have a U shaped bracket thereon that partially houses and is configured for pivotal connection to said A frame arm outboard spacer member by a mechanical fastener.

5. The improved dual front wheel vehicular steering and suspension system of claim 1 wherein said manual steering device is a set of handlebars.

6. The improved dual front wheel vehicular steering and suspension system of claim 1 wherein said first midpoint spacer member's pivotal connections to said stanchions reside in a common plane with the pivotal connections on the outboard ends of said lower A frame arm to the A frame arm outboard spacer member.

7. The improved dual front wheel vehicular steering and suspension system of claim 6 wherein said upper A frame arm and said lower A frame arm reside parallel to each other.

8. The improved dual front wheel vehicular steering and suspension system of claim 7 wherein said upper A frame arm and said lower A frame arm reside parallel to each other.

9. The improved dual front wheel vehicular steering and suspension system of claim 8 wherein said suspension members have an upper housing that partially constrains a suspension means and an extendable lower shock arm having a J shaped extension formed on a lower end thereof said shock arm to which said secondary steering arms are affixed.

10. The improved dual front wheel vehicular steering and suspension system of claim 9 wherein said lower and upper A frame arm's outboard ends each have a U shaped bracket thereon that partially houses and is configured for pivotal connection to said A frame arm outboard spacer member by a mechanical fastener.

11. The improved dual front wheel vehicular steering and suspension system of claim 10 wherein said manual steering device is a set of handlebars.

12. An improved dual front wheel steering and suspension system adapted for operation with a three or four wheeled vehicle comprising:
   a vehicle frame;
   a front stanchion extending substantially vertically from said vehicle frame;
   a rear stanchion extending substantially vertically from said vehicle frame and residing parallel to said front stanchion;
   a manual steering member rotationally supported by said frame;
   a rotatable, telescopic steering column connected at an upper end to said manual steering member;
   a main steering arm connected to a lower end of said steering column;
   a main steering arm support extending from a lower A frame arm and rotationally supporting said main steering arm;
   an upper A frame arm having two outboard ends each one pivotally connected to an upper end of a first or second A frame arm outboard spacer member, and having a first midpoint spacer member pivotally connecting said upper A frame arm between said front and rear stanchions;
   a lower A frame arm having two outboard ends each one pivotally connected to a lower end of said first or said second A frame arm outboard spacer member, and having a second midpoint spacer member pivotally connecting said lower A frame arm between said front and rear stanchions;
   two suspension members each rigidly connected to, and residing parallel to one of said A frame arm outboard spacer members;
   two front wheels each rotationally mounted on separate axles each connected to and supported by one of said suspension members;
   two secondary steering arms, each rigidly mounted onto one of said suspension members;
   a tierod having a first end and a second end each pivotally connected to one of said secondary steering arms;
   a steering linkage rod having a first end pivotally connected to said main steering arm and a second end pivotally connected to one of said secondary steering arms; and
   two foot steering pegs each one rigidly mounted to one of said A frame outboard spacer members.

\* \* \* \* \*